United States Patent [19]

Perlinski et al.

[11] Patent Number: 4,463,110
[45] Date of Patent: Jul. 31, 1984

[54] NEOPRENE LATEX CONTACT ADHESIVES

[75] Inventors: Witold Perlinski, Middlesex; Irwin J. Davis, Bridgewater; John F. Romanick, Denville, all of N.J.

[73] Assignee: National Starch and Chemical Corporation, Bridgewater, N.J.

[21] Appl. No.: 349,803

[22] Filed: Feb. 18, 1982

Related U.S. Application Data

[60] Division of Ser. No. 237,791, Feb. 24, 1981, Pat. No. 4,342,843, which is a continuation-in-part of Ser. No. 16,711, Mar. 1, 1979, abandoned.

[51] Int. Cl.$^3$ ............ C08L 9/00; C08L 61/04; C08L 63/00
[52] U.S. Cl. ............ 523/409; 523/408; 525/109; 525/113; 525/121
[58] Field of Search ............ 525/109, 113, 121; 523/408, 409

[56] References Cited

U.S. PATENT DOCUMENTS

| | | | |
|---|---|---|---|
| 3,124,548 | 3/1964 | Yaroch | 525/121 |
| 3,144,428 | 8/1964 | Kost | 525/109 |
| 3,280,215 | 10/1966 | Severance | 525/113 |
| 3,310,603 | 3/1967 | Kelly | 525/121 |
| 3,316,195 | 4/1967 | Grosner et al. | 523/444 |
| 3,393,173 | 7/1968 | Berry | 525/121 |
| 3,501,434 | 3/1970 | Chadwick | 525/121 |
| 3,714,115 | 1/1973 | Jonnes | 260/41.5 A |
| 3,926,880 | 12/1975 | Esser et al. | 524/273 |
| 4,012,350 | 3/1977 | Burke | 525/109 |
| 4,042,554 | 8/1977 | Paskitt | 260/29.7 NR |
| 4,101,481 | 7/1978 | Branlard | 260/29.7 NR |
| 4,169,822 | 10/1979 | Kutch | 525/107 |

FOREIGN PATENT DOCUMENTS

| | | | |
|---|---|---|---|
| 2537718 | 7/1976 | Fed. Rep. of Germany | 525/108 |
| 50-142633 | 5/1974 | Japan | 525/113 |
| 920802 | 3/1963 | United Kingdom | 525/113 |

*Primary Examiner*—John C. Bleutge
*Assistant Examiner*—Ana Carrillo
*Attorney, Agent, or Firm*—Edwin Szala; Ellen T. Dec

[57] ABSTRACT

The metal adhesion and heat and water resistance of conventional neoprene latex adhesives are improved by the addition thereto of a polyfunctional amine and an epoxy resin wherein for every 100 parts by weight of dry neoprene, the epoxy is added in an amount of 10–40 parts and the amine is added in an amount sufficient to provide 50–150% of the stoichiometric amount required to cure the epoxy.

8 Claims, No Drawings

NEOPRENE LATEX CONTACT ADHESIVES

CROSS-REFERENCE TO RELATED APPLICATIONS

This application is a divisional of our co-pending application, Ser. No. 237,791 filed Feb. 24, 1981, now U.S. Pat. No. 4,342,843 which is a continuation-in-part of our co-pending application, Ser. No. 016,711 filed Mar. 1, 1979, now abandoned.

BACKGROUND OF THE INVENTION

I. Field of the Invention

This application is directed to aqueous neoprene based contact adhesives characterized by superior metal adhesion and water and heat resistance.

II. Brief Description of the Prior Art

Solvent based polychloroprene or chloroprene-containing copolymers (commonly referred to as ("neoprene") adhesives have long been known in the art. These adhesives are often formulated as contact adhesives and, as such, are characterized by superior properties in areas as water resistance and metal adhesion. These adhesives are also characterized by a long bonding range or "open time", which means that there is a relatively long period after the adhesive is dry during which adhesive coated members can be successfully joined and bonded; suitable heat resistance, which refers to the ability of the bonded assembly to withstand elevated temperatures without lifting or deformation; and high immediate strength, which permits the bonded assembly to be handled and utilized within a reasonable time. In order to eliminate fire hazards and other environmental problems associated with these solvent based adhesives, attempts have been made to prepare these neoprene adhesives as latex systems (see, for example, U.S. Pat. No. 3,425,978). However, when the solvent based neoprene systems were replaced by latex based systems, the resulting contact adhesives were found to be inferior in quality, due primarily to their reduced metal adhesion particularly after exposure to moisture containing environments. Moreover, the heat resistance and "open time" were, in general, also inferior when compared with solvent based adhesives. For instance, where sufficient heat resistance is attained, the adhesives are deficient in bonding range, that is, the time after drying during which they can be pressed together and still form a suitable bond is too short for practical production applications. When the adhesive is formulated so as to lengthen the bonding range, the adhesive bond generally lacks sufficient rigidity, resulting in low initial strength and low shear strength, especially at elevated temperatures.

The present invention provides an aqueous neoprene contact adhesive characterized by improved metal adhesion, heat and water resistance as compared to conventional neoprene latex adhesives, which properties are, in some instances, superior to that herefore achieved with the solvent based systems. This invention also provides an aqueous contact adhesive possessing a high degree of heat resistance without loss of open time.

It has now been found that the addition of a polyfunctional amine and an epoxy component to conventional neoprene latices dramatically improves the metal adhesion as well as the heat and water resistance thereof.

Thus, the present invention discloses a contact adhesive composition comprising:

(a) a neoprene latex;
(b) a polyfunctional amine;
(c) an epoxy resin; and
(d) a tackifier;

wherein for every 100 parts by weight of dry neoprene, the epoxy resin component is present in an amount of 10 to 40 parts, the amine in an amount sufficient to provide 50–150% of the stoichiometric amount required to cure the epoxy resin, and the tackifier in an amount of 20 to 50 parts.

It will be apparent to one skilled in the art that, in order to provide shelf stability, it will be necessary to formulate the adhesive composition in two or three parts, thereby keeping the amine and epoxy components separated until shortly before use thereof. This aspect will be discussed in greater detail hereinbelow.

The contact adhesives herein are generally useful in the applications wherein solvent based neoprene adhesives have been employed. For example, they may be used to bond wood, metal sheets and foils, plastic foam, plastic films and sheets, rubber, fiber glass, etc. either to similar or different surfaces. The resultant bonds will, in general, possess properties comparable or superior to those achieved with solvent based neoprenes and superior to those achieved with conventional neoprene latex adhesives.

Commercially available neoprene latices or water dispersions thereof may be employed in producing the contact adhesives herein. Thus latices based on polychloroprene as well as on copolymers of chloroprene and other monomers such as acrylonitrile, methacrylic acid, sulfur, 2,3-dichloro-1,3-butadiene, etc. may be employed. The choice of the particular type of neoprene latex will, of course, depend on the properties (e.g. flammability, oil resistance, toughness, extensibility, crystallization rate, resistance to crystallization, etc.) required in the contemplated end use. For overall properties and ease of formulation, we have found the copolymers of chloroprene with methacrylic acid or 2,3-dichloro-1,3-butadiene to be most preferred. The use of a mixture of such latices is also contemplated herein in order to achieve an adhesive having properties which could not be obtained from a single latex composition.

The preparation of neoprene latices is well known and documented in the art.(See, for example, John C. Carl's book *Neoprene Latex* published in 1962 by E. I. du Pont de Nemours & Co., Wilmington, Del.) While the artisan in practicing the invention could prepare the emulsions, they are most commonly available in latex form from du Pont. The most commonly used and preferable latices are those designated by du Pont under the trademarks Latex 101, Latex 102, Latex 750 and Latex 400. It will be recognized, however, that other latices, particularly those conventionally used in adhesive formulations, may be adapted for use herein.

The amine component employed herein is generally a polyfunctional amine containing active hydrogens as a primary or secondary substituent. The most preferred amines are isophorone diamine and tetraethylene pentamine; however, other amines such as, for example, ethylene diamine, diethylene triamine, triethylene tetramine, propylene diamine, butylene diamine and hexamethylene diamine may also be used. It is preferred that the amine be water soluble and used in the form of a solution; however, organic solvents may be employed or emulsifiers may be used to produce an aqueous dispersion in the case of amines which are not water soluble.

Suitable epoxy resins for use in the contact adhesives herein include reaction products of bisphenol A and epichlorohydrin, epoxidized novolac resins formed by the reaction of epichlorohydrin with the resinous reaction product of phenol (or substituted phenols) and formaldehyde, resinous reaction products from epichlorohydrin and an aliphatic polyol such as glycerol, 1,4-butanediol, poly(oxypropylene) glycol or similar polyalcoholic components and resins obtained by epoxidation with peracetic acid. A particularly preferred epoxy resin is the 4,4'-isopropylidenediphenol epichlorohydrin reaction product, one of the bisphenol A-epichlorohydrin type materials which is available commercially from Shell Chemical under the trademark Epon 828. These epoxy resins are available either in liquid or solid form and may be used directly or may preferably be emulsified with water at a concentration of, for example, 40 to 75% solids by weight for use herein.

It will be recognized that any of the tackifiers generally used in neoprene contact adhesives may be used herein. The tackifiers are usually resinous in nature and include, for example, (1) natural and modified rosins such, for example, as wood rosin, tall-oil rosin, distilled rosin, hydrogenated rosin, dimerized rosin, and polymerized rosin; (2) glycerol and pentaerythritol esters of natural and modified rosins, such, for example, as the glycerol ester of pale wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins having a softening point, as determined by ASTM method E28-58T, of from about 80° to 150° C.; the latter polyterpene resins generally resulting from the polymerization of terpene hydrocarbons, such as the bicyclic mono-terpene known as pinene, in the presence of FriedelCrafts catalysts at moderately low temperatures; (4) phenolic resins such as BXKU-6387 (trademark of Union Carbide); (5) phenolic modified terpene resins such, for example, as the resin product resulting from the condensation in an acidic medium of a bicyclic terpene and a phenol, for example HRJ-790 (trademark of Schenectady Chemicals, Inc.); and (6) aliphatic petroleum hydrocarbon resins having a Ball and Ring softening point of from about 70° to 135° C.; the latter resins resulting from the polymerization of monomers consisting primarily of olefins and diolefins.

The relative amounts of the particular components employed will vary over a wide range depending upon the specific components as well as the desired end use. While the amounts may therefore be determined by the artisan, the following ranges may be used as a guideline: based on 100 parts by weight of dry neoprene, the epoxy resin will be present in an amount 10-40 parts; the amine in an amount sufficient to provide 50-150%, preferably 90-150%, of the stoichiometric amount required to cure the epoxy resin; and the tackifier in an amount of 20 to 50 parts.

In addition to the required components described above, various additives which are conventionally used in neoprene-based contact adhesives may also be employed herein. Such additives include, for example, fillers and pigments such as talc and titanium dioxide, thickeners, surfactants, solvents, etc. These additives are used in minor amounts comparable to those used in neoprene contact adhesives of the prior art.

Also generally employed herein are metallic oxide stabilizers, preferably zinc oxide, such as used in conventional neoprene contact adhesives. These metallic oxides serve as acid acceptors by neutralizing the hydrochloric acid which is released upon the aging of neoprene and thereby minimize the deterioration of the substrates which come into contact with the films derived from the adhesives. They serve, furthermore, as curing agents for the neoprene, thereby increasing the tensile strength of the resulting adhesive bonds, and also aid in the room temperature crosslinking of the neoprene films. The selected metallic oxide should be present in a concentration ranging up to a maximum of about 10% (and preferably 1-3%) by weight of the dry neoprene in the adhesive.

Ordinarily, the compositions described herein should also contain an antioxidant in order to prevent deterioration which is ordinarily manifested as embrittlement and discoloration. Among the applicable antioxidants are phenyl-alpha-naphthylamine, phenyl-beta-naphthylamine, phenyl-beta-naphthalene, and 2,2,'-methylene-bis (4-methyl-6-tertiary butyl-phenol). Concentrations of antioxidant ranging up to a maximum of about 2% by weight of the dry neoprene in the adhesive are sufficient for use herein.

As mentioned above, it is desirable to provide these novel contact adhesives as multi two or three part systems in order to obtain a product having a commercially acceptable shelf life. Thus, while the neoprene latex and tackifier (together with any conventional additives) may be provided as one component, the epoxy as a second and the amine as a third, we have found it most preferred to combine the latex and tackifier with the amine as one part and to separately provide the epoxy resin in emulsion form for addition to the latex, tackifier and amine prior to use. Depending on such factors as the particular amine and epoxy components employed, pot life of the final adhesive blend has been found to be about 1 to 3 days in length; in some cases it may extend up to 7 days.

Once combined, the adhesive may be used directly or may be further diluted with water depending on the solids level desired for the particular method of application to be employed.

When used, the adhesives are applied in conventional manner to one or preferably both of the surfaces to be bonded. Thus, they may be applied by brushing, spraying, curtain coating, roll coating, etc. The thus coated surface(s) generally are then force-dried and bonded by the use of sufficient pressure. The dry coating weights at which these adhesives are applied will, of course, vary according to its specific end use application and may range, for example, from about 25 to 126 kg per thousand square meters of coated surface.

In the following examples, which further illustrate the various embodiments of the invention, all parts are by weight and all temperatures in degrees Celsius unless otherwise noted.

TEST PROCEDURES

In the Examples below, the following test procedures are used to evaluate the neoprene adhesives herein.

The test specimens were prepared by applying 76-102 microns wet films of the adhesive to 0.05 cm aluminum and 0.64 cm plywood panels by means of a wire wound bar. The coated panels were then force dried for approximately 3 minutes at 120° C. and mated using a Black Brothers rotary press. The panels were then cut into 2.5×10 cm splints with 2.5 cm square overlap. These splints were conditioned one day at 48° C. and 3 days at 60° C. to insure cure. (The latter conditioning step provides an accelerated cure equivalent to approximately 3 to 4 weeks at ambient temperature.) The splints were then tested on an Instron Tensile Tester where they were delaminated at a crosshead speed of 0.13 cm per minute while the thus determined tensile shear strengths of the adhesive bonds were recorded in kg per square cm. Samples were tested at room temperature, tested after heating to 82° C. (for heat resistance) and tested wet after soaking in water for 16 hours (for water resistance).

EXAMPLE I

Seven adhesive formulations were formulated using the components and amounts shown in Table I. While formulations B, D, and F are "control" adhesives representing neoprene latex adhesives of the prior art, formulations A, C, E and G represent adhesives which have been prepared in accordance with the teachings herein.

TABLE I

|  | A | B | C | D | E | F | G |
|---|---|---|---|---|---|---|---|
| Part I (g) | | | | | | | |
| Latex 101[1] (46% solids) | 217 | — | — | — | — | — | — |
| Latex 102[2] (46% solids) | — | 217 | 217 | — | — | — | — |
| Latex 400[3] (50% solids) | — | — | — | 200 | 200 | — | — |
| Latex 750[4] (50% solids) | — | — | — | — | — | 200 | 200 |
| Aquarex WAQ (50% solids) surfactant | 2 | 2 | 2 | 2 | 2 | 2 | 2 |
| Isophorone Diamine (33% solids) | 10.1 | — | 10.1 | — | 13.5 | — | 13.5 |
| Dresinol 215 (45% solids) tackifier | 66 | 66 | 66 | — | — | — | — |
| Piconol A-800 (50% solids) tackifier | — | — | — | 60 | 60 | 60 | 60 |
| Zinc Oxide (60% solids) | 1.66 | 1.66 | 1.66 | 5 | 5 | 5 | 5 |
| Antioxidant (40% solids) | 5 | 5 | 5 | 5 | 5 | 5 | 5 |
| Part II | | | | | | | |
| Epon 828 (60% solids) | 25 | — | 25 | — | 33.3 | — | 33.3 |

[1]copolymer of chloroprene and methacrylic acid (36% Cl).
[2]copolymer of chloroprene and methacrylic acid (36% Cl) - lower gel content than 101.
[3]copolymer of chloroprene and 2,3-dichloro-1,3-butadiene (48% Cl).
[4]copolymer of chloroprene and 2,3-dichloro-1,3-butadiene (40% Cl).

All formulations exhibited good pot life and long bond range. When tested as described above, the tensile shear strengths shown in Table II were obtained (kg per square cm).

TABLE II

| Formulation | Room Temperature | 82° C. | 16 hour soak |
|---|---|---|---|
| A | 61.9 | 20.8 | 21.4 |
| B | 27.6 | 7.0 | 7.8 |
| C | 54.8 | 20.5 | 22.8 |
| D | 18.8 | 3.2 | delaminates |
| E | 35.2 | 13.2 | 20.0 |
| F | 13.6 | 1.9 | 3.1 |
| G | 16.9 | 3.9 | 10.7 |

As can be seen from the results presented in Table II, the addition of an epoxy resin and a polyfunctional amine to a conventional neoprene latex system dramatically improves the overall strength as well as the heat resistance and water resistance thereof.

EXAMPLE II

Two part adhesives were formulated as shown in Table I using Latex 102 (trademark) but varying the amount of epoxy resin added. In all cases isophorone diamine was added in a stoichiometrically equivalent amount based on the amount of epoxy resin. The tensile shear strength test results obtained with compositions of various epoxy levels (parts per hundred parts of neoprene) are shown in Table III. For comparison purposes the results shown for formulations B and C in Table II are repeated.

TABLE III

| Amount Epoxy | Room Temperature | 82° C. | 16 hour soak |
|---|---|---|---|
| 0 | 27.6 | 7.0 | 7.8 |
| 15 | 54.8 | 20.5 | 22.8 |
| 50 | 52.8 | 49.5 | delaminates |
| 75 | 62.4 | 41.6 | delaminates |
| 100 | 3.9 | 53.7 | delaminates |

The results shown in Table III illustrate the improved properties obtained using the teachings herein. The results also show that, in cases where moisture resistance is not a primary requirement, the heat strength of neoprene latex adhesives may be dramatically increased by using high levels of epoxy.

EXAMPLE III

A two part adhesive was prepared as in Example I using Latex 102, isophorone diamine and a water dispersible Bisphenol A type epoxy resin, available from Celanese as trademark WD510. Instead of performing the accelerated aging tests described previously, test samples were allowed to age under ambient conditions and tested at 82° C. at various intervals. After one week, results were 2.7 kg/cm$^2$; 6.2 kg/cm$^2$ after two weeks and 6.0 kg/cm$^2$ after four weeks. This compares with values of 1.4, 2.2 and 3.1 kg/cm$^2$, respectively, for similar systems wherein the amine and epoxy components were not employed.

EXAMPLE IV

Improved neoprene latex adhesives herein may be prepared using a variety of epoxy resins and polyfunctional amines Representative formulations are shown below.

| Part I (g) | | | | |
|---|---|---|---|---|
| Latex (dry wt.) | 100 | 100 | 100 | 100 |
| Epicure 878 (15% solids) (trademark of Celanese) | 28 | — | — | — |
| Aminoethyl Piperazine (15% solids) | — | 29 | — | — |
| Epicure 874 (15% solids) | — | — | 26 | — |

| | | | | |
|---|---|---|---|---|
| (trademark of Celanese) | | | | |
| Diethylene Triamine (15% solids) | — | — | — | 14 |
| Tackifier (dry weight) | 30 | 30 | 30 | 30 |
| Part II (g) | | | | |
| Epon 828 (60% solids) (trademark of Shell) | 17 | — | — | — |
| Araldite 7065 (60% solids) (trademark of Ciba) | — | 83 | — | — |
| ERL 2772 (60% solids) - (trademark of Union Carbide) | — | — | 33 | — |
| Epirez 519 (60% solids) - (trademark of Celanese) | — | — | — | 50 |

The preferred embodiments of the present invention having been described above, various modifications and improvements thereon will now become readily apparent to those skilled in the art. Accordingly, the spirit and scope of the present invention is defined not by the foregoing disclosure, but only by the appended claims.

We claim:

1. An improved multi-part aqueous contact adhesive composition containing not more than a minor amount of organic solvent consisting essentially of an unreacted blend of:
   (a) a neoprene latex,
   (b) a polyamine selected from the group consisting of isophorone diamines, tetraethylene pentamine, ethylene diamine, diethylene triamine, triethylene tetramaine, propylene diamine, butylene diamine and hexamethylene diamine,
   (c) an epoxy resin, and
   (d) a tackifier selected from the group consisting of phenolic resins and phenolic-modified terpene resins;

wherein for every 100 parts by weight of dry neoprene, the epoxy resin is present in an amount of 10 to 40 parts, the polyamine in an amount sufficient to provide 50 to 150% of the stoichiometric amount required to cure the epoxy, and the tackifier in an amount of 20 to 50 parts.

2. The adhesive composition of claim 1 wherein the composition is provided in two parts with part I comprising the neoprene latex, the amine and the tackifier and part II comprising the epoxy resin.

3. The adhesive composition of claim 1 wherein the neoprene latex comprises a copolymer of chloroprene with methacrylic acid or 2,3-dichloro-1,3-butadiene.

4. The adhesive composition of claim 1 wherein the amine is isophorone diamine.

5. The adhesive composition of claim 1 wherein the epoxy resin is selected from the group consisting of the reaction products of bisphenol A and epichlorodhydrin, epoxidized novolac resins, resinous reaction products formed by reaction of epichlorohydrin and an aliphatic polyol, and resins obtained by epoxidation with peracetic acid.

6. The adhesive composition of claim 5 wherein the epoxy resin comprises the 4,4'-isopropylidenediphenol epichlorohydrin reaction product.

7. The adhesive composition of claim 1 wherein amine is present in an amount sufficient to provide 90 to 150% of the stoichiometric amount required to cure the epoxy.

8. The adhesive composition of claim 1 wherein there is additionally present a metallic oxide stabilizer in an amount of about 1–3% by weight of the dry neoprene and an antioxidant in an amount less than about 2% by weight of the dry neoprene.

* * * * *